(12) United States Patent
Uhlik

(10) Patent No.: US 7,907,956 B2
(45) Date of Patent: Mar. 15, 2011

(54) HOPPING HARDWARE RESOURCES DURING PAGING IN A WIRELESS COMMUNICATIONS SYSTEM

(75) Inventor: Christopher R. Uhlik, Danville, CA (US)

(73) Assignee: Intel Corporation, Santa Clara, CA (US)

( * ) Notice: Subject to any disclaimer, the term of this patent is extended or adjusted under 35 U.S.C. 154(b) by 610 days.

(21) Appl. No.: 11/592,937

(22) Filed: Nov. 2, 2006

(65) Prior Publication Data

US 2007/0049299 A1    Mar. 1, 2007

Related U.S. Application Data

(63) Continuation of application No. 10/262,424, filed on Sep. 30, 2002, now abandoned.

(51) Int. Cl.
*H04W 68/00*    (2009.01)
*H04B 1/38*    (2006.01)

(52) U.S. Cl. .......... 455/458; 455/561; 370/343; 370/350

(58) Field of Classification Search .................. 455/561, 455/458; 370/343 M, 131, 350, 343; 375/131
See application file for complete search history.

(56) References Cited

U.S. PATENT DOCUMENTS

| | | | |
|---|---|---|---|
| 5,311,504 A | 5/1994 | Colamonico et al. | |
| 5,594,776 A | 1/1997 | Dent | |
| 5,937,002 A * | 8/1999 | Andersson et al. | 375/131 |
| 6,161,023 A | 12/2000 | Johnson et al. | |
| 6,230,026 B1 | 5/2001 | Schwaller et al. | |
| 6,389,057 B1 | 5/2002 | Haartsen | |
| 6,711,151 B1 * | 3/2004 | Ziegler | 370/350 |
| 7,227,855 B1 * | 6/2007 | Barratt et al. | 370/343 |
| 7,424,002 B2 * | 9/2008 | Barratt et al. | 370/343 |
| 2003/0231607 A1 | 12/2003 | Scanlon et al. | |
| 2004/0063465 A1 * | 4/2004 | Uhlik | 455/561 |
| 2007/0049299 A1 * | 3/2007 | Uhlik | 455/458 |

FOREIGN PATENT DOCUMENTS

| | | |
|---|---|---|
| WO | WO 02/28119 A2 | 4/2002 |
| WO | WO 02/28121 A2 | 4/2002 |
| WO | WO 03/013078 A1 | 2/2003 |

OTHER PUBLICATIONS

Int'l Application No. PCT/US03/29891 filed Sep. 23, 2003; In'tl Search Report.
Office Action for U.S. Appl. No. 10/262,424 mailed Oct. 24, 2005, whole document.
Final Office Action for U.S. Appl. No. 10/262,424 mailed Aug. 2, 2006, whole document.
Office Action for U.S. Appl. No. 10/262,424 mailed Mar. 21, 2007, whole document.
Final Office Action for U.S. Appl. No. 10/262,424 mailed Sep. 10, 2007, whole document.

* cited by examiner

*Primary Examiner* — William D Cumming
(74) *Attorney, Agent, or Firm* — Blakely, Sokoloff, Taylor & Zafman LLP

(57) ABSTRACT

A hardware resource is selected from a plurality of distributed and independent hardware resources based on a hopping sequence that indicates a sequence of hardware resources over periods of time. A page is transmitted to a user terminal using the selected hardware resource.

17 Claims, 2 Drawing Sheets

HOPPING HARDWARE RESOURCES DURING PAGING IN A WIRELESS COMMUNICATIONS SYSTEM

This application is a continuation of U.S. application Ser. No. 10/262,424 filed Sep. 30, 2002 now abandoned; and also claims priority of co-pending application Ser. No. 09/919,726 which claims the benefit of provisional Application No. 60/277,591 entitled Resource Allocation in a Wireless Network, filed Mar. 20, 2001.

BACKGROUND OF THE INVENTION

1. Field of the Invention

The present invention applies to the field of wireless communications systems and, in particular, to paging user terminals.

2. Description of the Prior Art

Some communications systems, such as cellular voice and data communications systems, have several base stations in different locations available for use by mobile or fixed user terminals. User terminals can be cellular phones, PDA's, laptop computers, or any other wireless devices. When a base station needs to initiate communication with a user terminal, the base station pages the user terminal. When idle, the user terminal periodically listens for these pages.

The user terminal listens for pages on designated radio frequency (RF) resources. An RF resource can be, for example, an RF carrier, such as a 625 kHz band around a central frequency, e.g., as 800 MHz or 1.9 GHz, a timeslot in a TDMA (Time Division Multiple Access) frame, a frame, a CDMA (Code Division Multiple Access) code, or some combination of these resources. Thus, an RF resource can be thought of as a conventional communications channel. Similarly, if a conventional channel uses hopping, the resulting conventional logical channel can be thought of as a series of RF resources.

Some radio communications systems use frequency hopping on communications channels. Frequency hopping can reduce multipath fading. Frequency hopping can also be used to create interferer diversity, reducing the likelihood of prolonged severe interference on one channel.

BRIEF SUMMARY OF THE INVENTION

Embodiments of the present invention can be used to send a page from a base station to a user terminal using a hardware resource indicated by a hopping sequence. In one embodiment, the invention includes the base station selecting a hardware resource from a plurality of distributed and independent hardware resources, such as DSPs, based on a hopping sequence that indicates a sequence of hardware resources over periods of time. The base station can then transmit a page to a user terminal using the selected hardware resource.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

According to one embodiment of the invention, a base station uses one independent, distributed hardware resource to process all spatial channels occupying a conventional logical channel, i.e., an RF carrier/timeslot pair. When the base station pages a user terminal, the base station maps the user terminal's paging identifier (PID) to a hopping sequence indicating a series of hardware resources each servicing one conventional logical channel, and sends a page on the paging spatial channel of the conventional logical channel associated with the hardware resource indicated by the hopping sequence at a given time.

Paging in a Wireless Communication System

Figure 1:
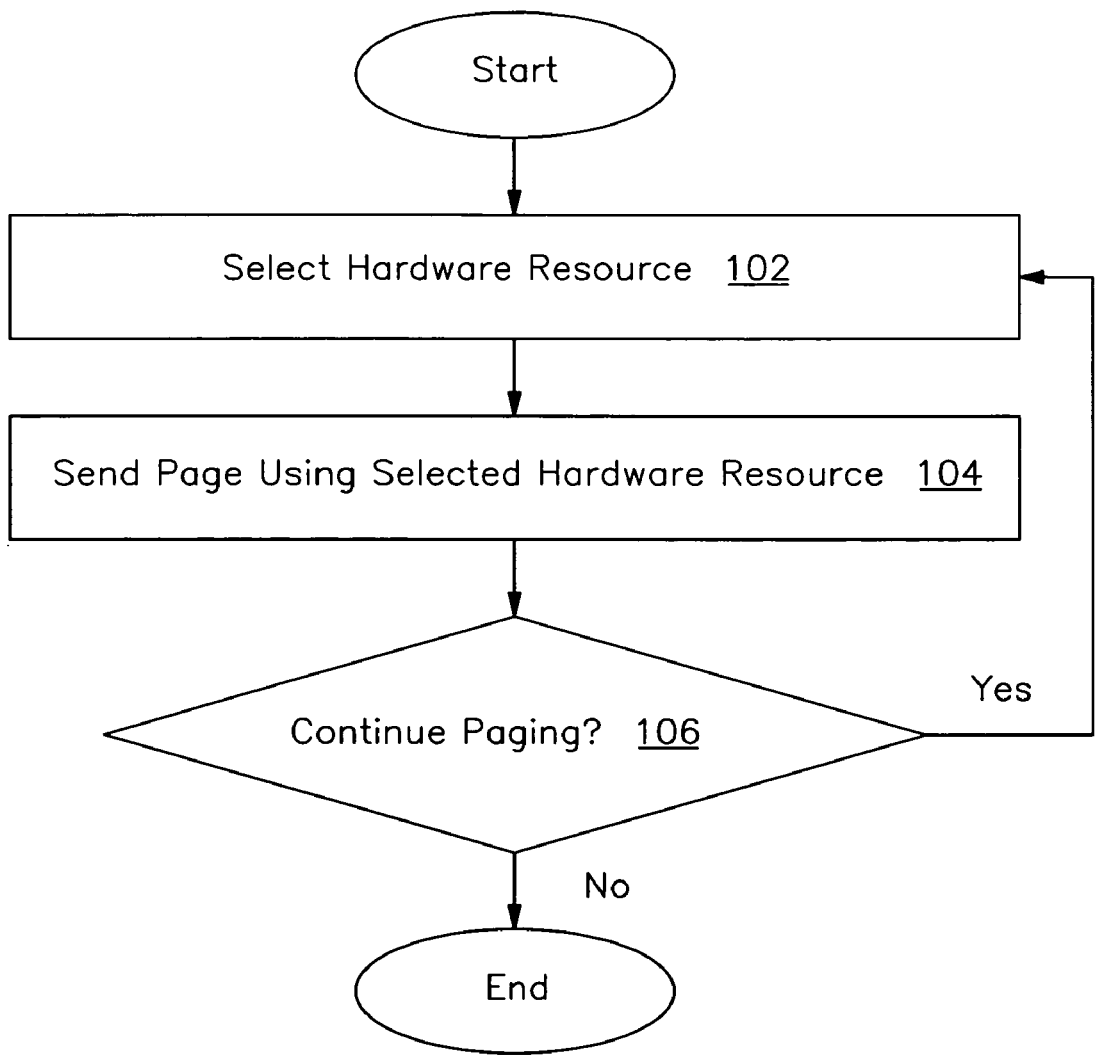
FIG. 1 is a flow chart of selecting a hardware resource to be used for transmitting a page according to one embodiment of the invention.
Figure 2:
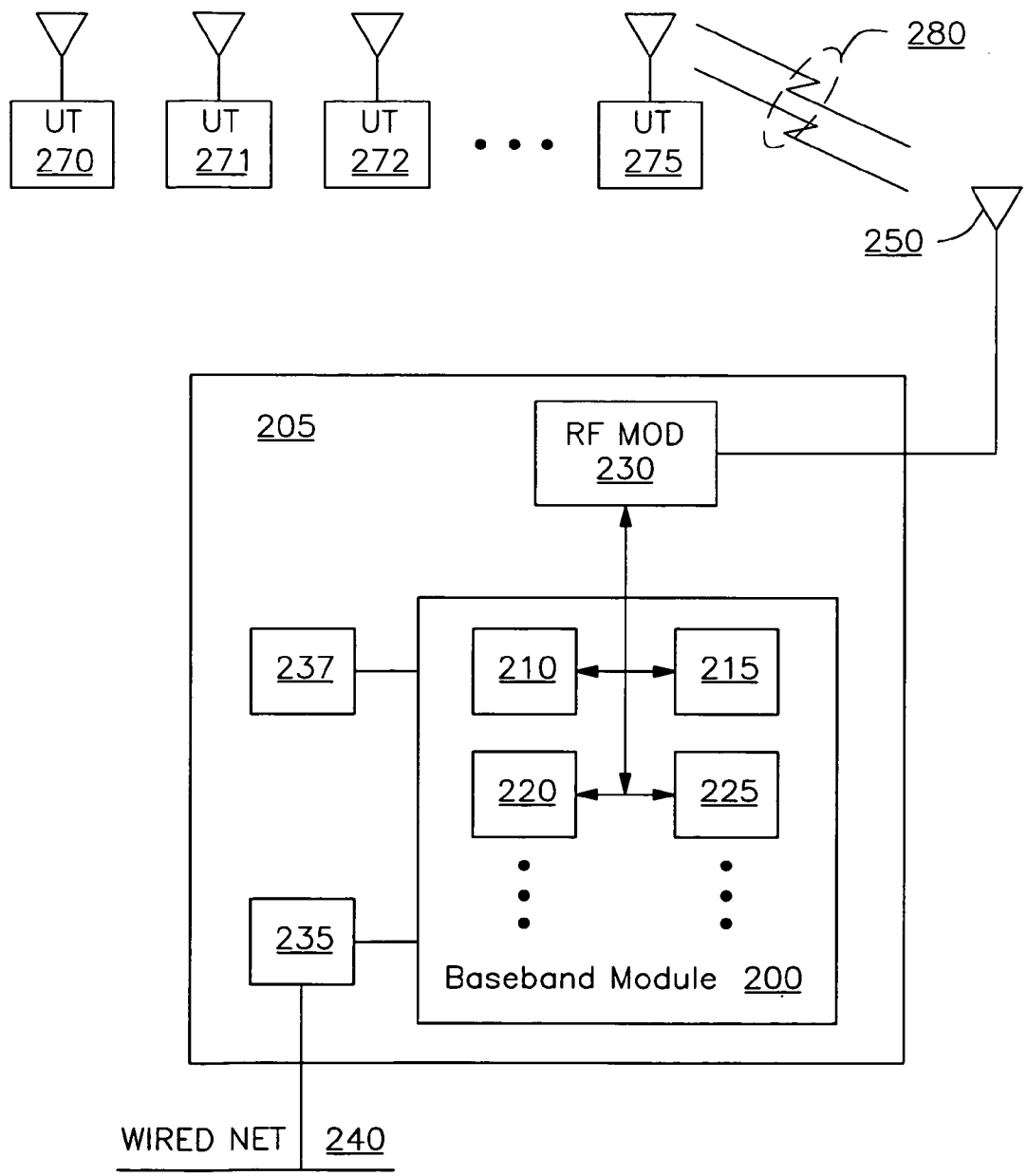
FIG. 2 is a simplified block diagram of a base station on which an embodiment of the invention can be implemented.

One embodiment of the present invention is now set forth with reference to FIG. 1. When the base station needs to page a user terminal, it selects 102 a hardware resource to use for transmitting the page. A hardware resource may be a distributed processor, such as a DSP connected to a central processor that controls the distributed DSPs, such as DSPs 210-225 in FIG. 2. Alternatively, a hardware resource may be part of a chip or processor that is assigned to process signals for one conventional logical channel.

The page may be a page signal or page burst containing some identification of the user terminal, such as a paging identifier (PID), user terminal identifier (UTID), or any other unique identifier. The identifier can be unique only at the base station, or it can be unique throughout the network. This identifier lets the user terminal know it is being paged. The page burst can also include a common counter, such as all or part of an Absolute Frame Number (AFN).

After selecting the hardware resource, the base station sends 104 the page using the selected hardware resource. For example, if the selected hardware resource is DSP#2, and during the present frame DSP#2 is assigned to transmit on Carrier#6/Timeslot#2, then the page signal will be generated and processed using DSP#2 and transmitted in Timeslot#2 on Carrier#6. Other signals, such as traffic bursts to other user terminals, can also be processed by DSP#2 and transmitted in Timeslot#2 on Carrier#6 by using a Spatial Division Multiple Access (SDMA) technique.

The selection of hardware resources is according to a hopping sequence that indicates a sequence of hardware resources over periods of time. For example, a hopping sequence can be DSP#1, DSP#3, DSP#4, DSP #2, repeating over time. If these are the only available DSPs, this hopping sequence hits all DSPs. In one embodiment, the hops occur every frame, but they can occur more frequently or less frequently.

The user terminal being paged also knows the hopping sequence, and can thus listen for the page on the designated RF resource associated with the DSPs hit by the hopping sequence at any given time. This RF resource can be a fixed RF resource or a sequence of RF resources organized into a logical channel according to a hopping sequence, such as a frequency hopping sequence for traffic channels.

After the base station sends the page, it decides whether to continue 106 paging. A base station may decide to end paging 108 because it received a response to an earlier page from the user terminal, e.g. a random access burst, because the paging times out, e.g. after 20 unsuccessful pages, or for any other reason. If the base station decides to continue paging into a new time period, such as the next frame, the base station again selects 102 a hardware resource according to the hopping sequence, and the process continues.

Qualities of Hopping Sequences

In one embodiment of the present invention, the hopping sequence used for selecting hardware resources has some desirable qualities. One such quality is that each hopping sequence hit all available hardware resources, and hit them in an even fashion over time. For example, assuming five available DSPs (0-4) the sequence <0,1,1,2,3> does not hit all DSPs. The sequence <1,2,3,2,4,2,0> does hit all DSPs, but it hits 2 more than the others, thus, the DSPs are not hit evenly over time. On the other hand, the sequence <0,2,3,4,1> hits all DSPs evenly over time.

In one embodiment, another desirable quality of these hopping sequences is that two hopping sequences do not hit the same hardware resources for extended periods of time. A hardware resource may only be configured to be used for one page at a time. That is, it may be undesirable for two hopping sequences used for two different user terminals the base station wants to page to indicate the same sequence of hardware resources over several hops.

Again using the example with five DSPs (0-4), the sequence pair <0,1,2,3,4> and <1,2,3,4,0> never indicates the same DSP at the same time. The sequence pair <0,1,2,3,4> and <2,1,4,3,0> does have some collisions at time interval two and time interval four. However, the two sequences never collide over two or more consecutive time periods. In contrast, the sequence pair <0,1,2,3,4> and <0,1,2,4,3> not only collide, but collide over subsequent periods of time.

One way to generate hopping sequences that have the desirable qualities described above, is by using Orthogonal Latin Squares (OLS). For example, given five hardware resources (0-4) an OLS can generate five hopping sequences that never collide. For example, one possible OLS will generate hopping sequences #1-#5:

|   |
|---|
| #1: 0 1 2 3 4 |
| #2: 1 2 3 4 0 |
| #3: 2 3 4 0 1 |
| #4: 3 4 0 1 2 |
| #5: 4 0 1 2 3 |

To accommodate the paging of more user terminals, more hopping sequences may be desired. One way to generate more hopping sequences is by multiplying the original hopping sequences generated by the OLS (#1-#5) by 2, 3, and 4 modulo 5, to result in fifteen additional hopping sequences:

| 0 2 4 1 3 | 0 3 1 4 2 | 0 4 3 2 1 |
|---|---|---|
| 2 4 1 3 0 | 3 1 4 2 0 | 4 3 2 1 0 |
| 4 1 3 0 2 | 1 4 2 0 3 | 3 2 1 0 4 |
| 1 3 0 2 4 | 4 2 0 3 1 | 2 1 0 4 3 |
| 3 0 2 4 1 | 2 0 3 1 4 | 1 0 4 3 2 |

In a similar fashion, if there are N hardware resources N(N−1) hopping sequences can be generated. The sequences generated by this process have the desired qualities discussed above. First, all sequences will hit all hardware resources evenly. Second, any two training sequences that collide during one time period, will not collide in the next consecutive time period. Other methods exist for generating more hopping sequences, and the quality of these hopping sequences can be defined in numerous ways. In one embodiment, the hopping sequences are designed so that if two hopping sequences collide during one time period, the probability that they collide in the next consecutive time period is below a threshold, such as below 2 percent. Other threshold can be used depending on desired paging efficiency, the number of available hardware resources, and other factors.

Demonstrative Example

A highly detailed example embodiment is now described to illustrate the present invention. The invention is not limited by the details of this example. The communications system of this example is a hybrid of packet switched communications and circuit switched communications, in which data is transferred in streams, defined as a series of zero or more packets.

Whenever a base station (BS) has a packet to send to a user and a stream is not already active with that user, the user being a device or application associated with a User Terminal (UT), the user is notified via a page directed to the UT. Likewise, whenever the user has a packet to transmit to the BS and a stream is not active between the BS and the user, the UT requests to begin a stream with the BS via a random access (RA) request. Once the stream is established, packets may follow immediately after one another until either the user or BS decides to terminate the stream.

A UT or the example communications system registers with a BS to form a relationship referred to as a registration. The registration enables the UT and the BS thereafter to exchange both control messages and data messages. Registration includes assignment of a paging identifier (PID), and registration identifier (RID), and network security configuration. In one embodiment, a registration is with the base station. In other embodiments, the registration occurs further upstream, such as during establishment of a network session resulting from logging into an Internet Service Provider (ISP) via a gateway provided by, or accessible to, the BS.

After registration, either the BS or the UT can initiate streams. During idle periods, that is, when no existing streams are open between a BS and the UT, the UT may periodically listen for pages in the downlink direction from the BS. After a long idle period, the registration between the UT and BS times out and ends.

As discussed above, the UT is assigned several identifiers during registration. One identifier is the paging identifier (PID) that is unique to the UT at the BS. That is, no other UT registered at the BS has this PID. This PID is included in the page to let the UT know it is being paged.

The PID is also used to select a hopping sequence. When the BS wants to page the UT, it maps the PID to a hopping sequence. For example, if there are twenty hopping sequences numbered 0-19, then the mapping function may be PID (mod 20). Thus, a PID of 25 would map to hopping sequence number 5. The mapping is designed such that hopping sequences are not reused unless necessary, i.e., when there are more registered UTs than hopping sequences. Many such mapping functions are possible.

A base station, as may be utilized in this example communications system, is illustrated in FIG. 4. The base station 205 comprises a baseband module 400, having multiple, distributed hardware resources, such as digital signal processors 410-425. In one embodiment, the DSPs are Motorola MC56311 DSPs. Each of the DSPs is coupled to an RF module 230, providing a conversion of digital to analog signals for downlink transmissions, and analog to digital conversion of received uplink signals to digital signals, for processing by at least one of the DSPs. The RF module 230 optionally provides for amplification of analog signals.

An antenna array 250 provides for transmitting and receiving signals 280 to communicate with user terminals, e.g., UTs 270-275, in the same sector of a wireless communications network as the BS. A network card or network switch 235 provides transmission and/or routing capabilities in association with a wired network, such as an Ethernet network 240 or the Internet. Thus, for example, data may be received via the network card or switch from the Internet and transmitted over the air interface to one or more user terminals.

In this example, the DSPs operate substantially independently of one another under the control of a central processor 237. Each DSP is assigned to process signals on conventional communications channel. In one embodiment, a conventional communications channel is a non-hopping RF carrier/timeslot pair. Thus, each DSP is assigned to a RF resource, the RF resource being the RF carrier/timeslot pair or the FDMA/TDMA system. Other conventional definitions can be used in other embodiments.

When the base station 205 wants to prompt a user terminal 272 to open a stream, the base station needs to send a page to the user terminal 272. In this example, each DSP 210-225 processes all signals on a conventional channel defined by a RF carrier/timeslot pair. Using the antenna array 250 and SMDA techniques, the base station 205 can communicate with multiple user terminals on each conventional channel by splitting it into multiple spatial channels that occupy the conventional channel.

The base station 205, using central processor 237, maps the PID of user terminal 272 to a hopping sequence. The base station 205 then determines which DSP the hopping sequence indicates for the next frame. In this example, that is DSP 215 assigned to a conventional channel having three spatial channels, two of which are used to send traffic bursts. The base station 205 uses DSP 215 to encode the page and transmit it to user terminal 272. At the same time, DSP 215 transmits the two traffic bursts on the same conventional channel using spatial processing or other spatial division multiple access (SDMA) techniques.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIG. 2, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using frequency hopping and spatial processing. These devices may be cellular phones, PDA's, laptop computers, or any other wireless devices. These devices may sometimes be generally referred to as radios or transceivers.

Furthermore, in portions of the description above, various example sequences are shown that have certain lengths, i.e., number of symbols. Sequences of other lengths are also discussed. However, embodiments of the present invention may be used with core training sequences, or any other sequence, of any size.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method for transmitting a page from a base station comprising:

selecting a hardware resource from a plurality of distributed and independent hardware resources based on a hopping sequence that indicates a sequence of hardware resources over periods of time, wherein the distributed and independent hardware resources comprise at least a plurality of digital signal processors (DSPs), each of which is coupled to at least a radio frequency (RF) module and the hardware resource is selected based on a mapping of a paging identifier (PID) of a user terminal; and transmitting the page to the user terminal using the selected hardware resource.

2. The method of claim 1, wherein the page is transmitted via the RF module.

3. The method of claim 2, wherein a period of time comprises a frame divided into timeslots, and the RF module comprises one timeslot of the frame on a carrier frequency, the timeslot and the carrier frequency comprising a communications channel.

4. The method of claim 3, further comprising transmitting a second burst to a second user terminal in the timeslot on the carrier frequency associated with the selected hardware resource using a spatial channel.

5. The method of claim 3, wherein the selected hardware resource is uniquely associated with the communications channel.

6. The method of claim 4, wherein the communications channel hops carrier frequencies over time.

7. The method of claim 1, wherein the plurality of hardware resources comprises a plurality of distributed and independent digital signal processors (DSPs).

8. The method of claim 1, wherein the plurality of hardware resources comprises a plurality of portions of a processor, each portion assigned to process signals on one conventional channel.

9. The method of claim 1, wherein if the hopping sequence collides with a second hopping sequence used for paging a second user terminal in an initial period of time, then the hopping sequence does not collide with the second hopping sequence in a subsequent period of time.

10. The method of claim 9, wherein the subsequent period of time is the next consecutive period of time with a sufficient statistical probability.

11. The method of claim 1, wherein the page comprises a prompt to the user terminal to request access to the base station.

12. A communications device comprising:
a plurality of distributed and independent hardware resources comprising at least a plurality of digital signal processors (DSPs), each of which is coupled to at least a radio frequency (RF) module;
a central processor coupled to the plurality of hardware resources to select one of the hardware resources based on a hopping sequence indicating a sequence of hardware resources over periods of time, wherein the hardware resource is selected based on a mapping of a paging identifier (PID) of a user terminal; and
an antenna array coupled to the plurality of hardware resources to transmit a page to a user terminal using the selected hardware resource.

13. The communications device of claim 12, wherein the page is transmitted from the antenna array via the RF module.

14. The communications device of claim 13, wherein the communications device is a base station or a user terminal.

15. The communications device of claim 12, wherein the plurality of hardware resources comprises a plurality of portions of a processor, each portion assigned to process signals on one conventional channel.

16. A non-transitory machine-readable storage medium containing executable instructions, which when executed by a base station processor, cause the processor to perform operations comprising:
selecting a hardware resource from a plurality of distributed and independent hardware resources based on a hopping sequence that indicates a sequence of hardware resources over periods of time, wherein the distributed and independent hardware resources comprise at least a plurality of digital signal processors (DSPs), each of which is coupled to at least a radio frequency (RF) module and the hardware resource is selected based on a mapping of a paging identifier (PID) of a user terminal; and
transmitting the page to the user terminal using the selected hardware resource.

17. The non-transitory machine-readable storage medium of claim 16, wherein the page is transmitted via the RF module.

* * * * *